United States Patent
Koebele et al.

(10) Patent No.: US 9,225,461 B2
(45) Date of Patent: Dec. 29, 2015

(54) METHOD OF OPTICAL DATA TRANSMISSION USING MODE DIVISION MULTIPLEXING

(71) Applicant: Alcatel Lucent, Boulogne Billancourt (FR)

(72) Inventors: Clemens Koebele, March (DE); Massimiliano Salsi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/382,964

(22) PCT Filed: Mar. 25, 2013

(86) PCT No.: PCT/EP2013/056211
§ 371 (c)(1),
(2) Date: Sep. 4, 2014

(87) PCT Pub. No.: WO2013/144062
PCT Pub. Date: Oct. 3, 2013

(65) Prior Publication Data
US 2015/0043910 A1 Feb. 12, 2015

(30) Foreign Application Priority Data
Mar. 30, 2012 (EP) .................................. 12305371

(51) Int. Cl.
*H04J 14/04* (2006.01)
*H04J 14/06* (2006.01)
*H04B 10/2581* (2013.01)
*H04B 10/25* (2013.01)

(52) U.S. Cl.
CPC ............ *H04J 14/04* (2013.01); *H04B 10/2504* (2013.01); *H04B 10/2581* (2013.01); *H04J 14/06* (2013.01)

(58) Field of Classification Search
CPC .......... H04J 14/04; H04J 14/02; H04J 14/00; H04B 10/2581; H04B 10/2504
USPC ............... 398/44, 43, 79, 142, 143, 158, 159; 385/24, 28, 31, 123, 124, 126, 127
See application file for complete search history.

(56) References Cited

U.S. PATENT DOCUMENTS

| 8,705,913 B2 * | 4/2014 | Winzer ..................... G02B 6/14 385/28 |
| 8,891,964 B2 * | 11/2014 | Cvijetic .................. H04J 14/04 398/142 |
| 2010/0329671 A1 | 12/2010 | Essiambre et al. |

OTHER PUBLICATIONS

Salsi, Massimiliano et al; Mode-Division Multiplexing of 2 x 100 Gb/s Channels Using an LCOS-Based Spatial Modulator; Journal of Lightwave Technology, IEEE Service Center; New York, NY, US; vol. 30, No. 4; Feb. 15, 2012; pp. 618-623; XP011401954; ISSN: 0733-8724; DOI: 10.1109/JLT.2011.2178394.

(Continued)

*Primary Examiner* — Hanh Phan
(74) *Attorney, Agent, or Firm* — Patti & Malvone Law Group, LLC

(57) ABSTRACT

A method and a device for optical data transmission are proposed. Incoming optical signals having respective incoming waveguide modes are mapped into outgoing optical signals having respective outgoing waveguide modes, using optical spatial modulators, whose multiplicative patterns correspond to the respective electrical field patterns of the respective incoming or outgoing waveguide modes. An incoming optical signal, whose respective incoming waveguide mode is of an azimuthal order equal to zero, results in an outgoing optical signal, whose respective outgoing waveguide mode is of an azimuthal order equal to zero. Furthermore, two incoming optical signals, whose respective second incoming waveguide modes are of a same azimuthal order greater than zero, of a same radial order, and orthogonal to each other result in respective outgoing signals, whose respective outgoing waveguide modes are off a same azimuthal order greater than zero, of a same radial order and orthogonal to each other.

14 Claims, 12 Drawing Sheets

(56) References Cited

OTHER PUBLICATIONS

Yong, Y.S. et al; Cascaded Five-Fold Mode-Order Switching Device; Biophotonics/Optical Interconnects and VLSI Photonics/WBM Microcavities; 2004 Digest of the Leos Summer Topical Meetings San Diego, CA; USA Jun. 28-30, 2004; Piscataway, NJ; USA; IEEE; Jun. 28, 2004; pp. 53-54; XP010727989; ISBN 978-0-7803-8306-7.

* cited by examiner

Fig. 2

| Mode | DMGD (w.r.t LP01) | Spatial Distribution |
|---|---|---|
| LP01 | 0 | MP01 |
| LP11 | 4.4 | MP11a + MP11b |
| LP21 | 8.7 | MP21a + MP21b |
| LP02 | 7.5 | MP02 |

T1

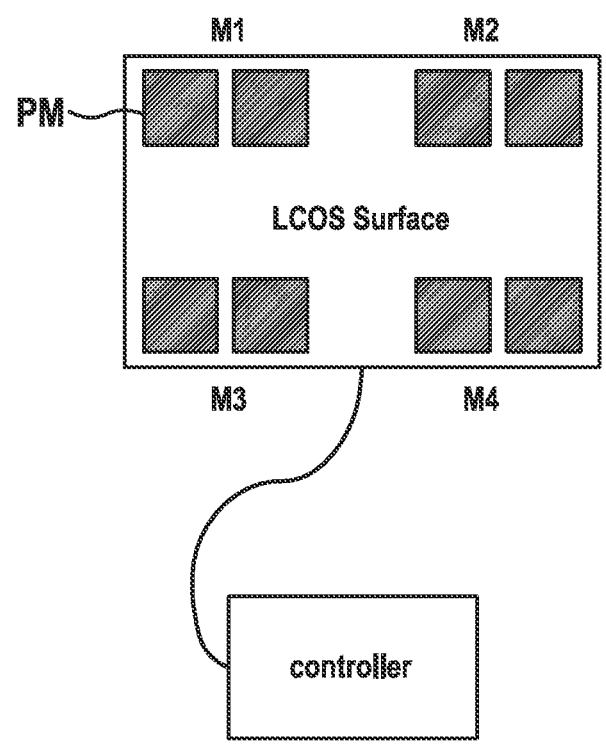

METHOD OF OPTICAL DATA TRANSMISSION USING MODE DIVISION MULTIPLEXING

FIELD OF THE INVENTION

The invention is based on a priority application EP12305371.2 which is hereby incorporated by reference.

The invention relates to a method and an optical device for data transmission using Mode Division Multiplexing.

BACKGROUND

In optical data transmission, data may be transmitted via an optical waveguide by means of an optical signal having a specific wavelength, preferably called carrier wavelength. The optical signal may be modulated for indicating transmitted data, wherein the modulation may be carried out as amplitude- and/or phase-modulation in dependence on the data that is to be transmitted. A prominent phase-modulation method is for example Quadrature Phase-Shift Keying (QPSK). Another prominent modulation method employing amplitude- and phase modulation is for example 16-Quadrature Amplitude Modulation (16-QAM).

In order to increase the data rate, not only one optical data signal of the specific wavelength may be transmitted, but more than one optical data signal may be transmitted in a so called multiplexing technique.

In the multiplexing technique of Wavelength Division Multiplexing (WDM), multiple optical data signals with respective wavelengths different from each other are transmitted via the same waveguide. Each signal is modulated individually in dependence on the data to be transmitted via the respective signal.

Another multiplexing technique is that of polarization division multiplexing (PDM). In PDM, two optical signals, which have a same wavelength but respective polarization states that are orthogonal to each other, are transmitted via the same waveguide. Also in PDM, each signal is modulated individually in dependence on the data to be transmitted via the respective signal. The technique of PDM may be combined with that of WDM, in order to further increase the data rate.

An optical signal of a single wavelength can be described as an electromagnetic wave, that possess the single wavelength, and wherein the electrical field and the magnetic field are orthogonal to each other.

An optical signal with a specific wavelength propagating through an optical Single Mode Fiber (SMF) is often described as can be described as a Transverse Electro Magnetic (TEM) Mode, wherein the electromagnetic wave has an electrical field and a magnetic field that have no field component in the direction of propagation, and wherein the so called mode pattern describes the distribution of the electrical field in space within the plane that is perpendicular to the direction of propagation. Within an SMF, only a propagation of an optical signal with a fundamental mode is possible.

A so called optical Multi Mode Fiber (MMF) is a fiber, in which not only one optical signal of the specific wavelength may propagate as a TEM Mode as the fundamental mode, but multiple optical signals may propagate within the fiber as different TEM modes of the same specific wavelength. The different TEM modes differ in their respective mode patterns of their respective electrical fields.

A mode can be uniquely identified by its azimuthal periodicity and by the number of zero crossings in its radial function. Thus, a mode and its respective mode pattern are classified by a so called azimuthal order and a so called radial order. This leads to a unique pattern consisting of zones with positive and negative sign for the complex electrical field, equivalent to phase levels of 0 and pi. The azimuthal order with index I indicates the number of periods that a mode pattern has, when passing along a circular orbit around the origin of the mode pattern. The radial order with index m indicates the number of extrema that a mode pattern has along a radius going through the origin of the mode pattern. For modes of an azimuthal order of I=0, the radial order m indicates a number of 2 m+1 extrema. For modes of an azimuthal order of I>0, the radial order m indicates a number of 2m extrema. A mode of a so called higher order is one, which has an azimuthal order greater than zero. Thus, a higher azimuthal order is one with an index I>0.

A mode of an azimuthal order equal to zero has a mode pattern that is rotationally invariant. This may be either the fundamental mode, for which the radial order is equal to one, or a higher mode, for which the radial order is higher than one.

For a mode of an azimuthal order equal to or greater than one and a given radial order, there exists also another mode of the same azimuthal order and the same radial order, for which the mode patterns of the two modes are orthogonal to each other, e.g. the surface integral of the mode patterns' product is equal to zero.

The technique of Mode Division Multiplexing (MDM) may be employed within a MMF, wherein different optical signals as different TEM modes of the same wavelength may transmit respective individual data within the MMF.

SUMMARY

Proposed is a method of optical data transmission using Mode Division Multiplexing. The method comprises different steps.

A plurality of incoming optical signals having respective incoming waveguide modes are demultiplexed from an incoming optical multi-mode fiber into respective intermediate optical signals having essentially a fundamental waveguide mode. The step of demultiplexing is carried out using respective first optical spatial modulators, whose multiplicative patterns correspond to the electrical field patterns of the incoming waveguide modes.

The intermediate optical signals are multiplexed into respective outgoing optical signals having respective outgoing waveguide modes within an outgoing optical multi-mode fiber. The step of multiplexing is carried out using respective second optical spatial modulators, whose multiplicative patterns correspond to the electrical field patterns of the outgoing waveguide modes.

The steps of demultiplexing and multiplexing are carried out, such that a first incoming optical signal, whose respective first incoming waveguide mode is of an azimuthal order equal to zero, results essentially in such a first outgoing optical signal, whose respective first outgoing waveguide mode is of an azimuthal order equal to zero.

Furthermore, the steps of demultiplexing and multiplexing are carried out, such that two second incoming optical signals, whose respective second incoming waveguide modes are
   of a same azimuthal order greater than zero,
   of a same radial order, and
   orthogonal to each other
result essentially in such respective second outgoing signals, whose respective second outgoing waveguide modes are
   of a same azimuthal order greater than zero,
   of a same radial order, and
   orthogonal to each other.

These incoming waveguide modes and outgoing waveguide modes preferably differ in at least their azimuthal order or their radial order.

In order to appreciate the advantages of the proposed method, different aspects have to be taken into consideration.

Different Modes may have different propagation delays within a same optical MMF, often called differential mode group delay (DMGD). Thus, two optical signals of different modes arrive at a receiving device at different points of time. In order to compensate such a delay difference, algorithms may be employed at the receiving device, wherein the maximum delay difference that such an algorithm is able to compensate may not be exceeded. Therefore, by mapping incoming optical signals having respective incoming waveguide modes within an incoming optical MMF onto outgoing optical signals of different waveguide modes within an outgoing optical fiber, averaging of the DMGDs for the different signals is achieved, which in turn may help to keep the delay difference between the different optical signals below the maximum delay difference at a receiving device located at the other end of the outgoing optical fiber.

Furthermore, it has to be taken into consideration, that due to nonlinearities of optical MMFs, the orientation of a TEM mode pattern of higher azimuthal and radial order will not be constant at every point along the MMF, but rotates along the MMF. Even furthermore, this orientation may vary in time. Thus, when receiving such an incoming optical signal with an incoming TEM waveguide mode and demultiplexing it into an intermediate optical signal having a fundamental TEM waveguide mode by means of an optical spatial modulator, whose pattern corresponds to the electrical field pattern of the incoming waveguide mode, it is a crucial aspect whether the orientation of the mode pattern of the incoming waveguide mode is aligned with the orientation of the mode pattern of the spatial modulator. A misalignment of orientation between the mode pattern of the incoming waveguide mode signal and the mode pattern of the spatial modulator may lead to an intermediate signal with modified signal components. Thus, a possible source of misalignment of orientation for an incoming mode pattern is given by the optical spatial modulators used for demultiplexing.

These problems are counteracted by the proposed method in the following manner: Demultiplexing and multiplexing is carried out, such that two incoming optical signals, whose respective incoming waveguide modes are of a same higher azimuthal order, of a same radial order and also orthogonal to each other result in two outgoing signals, whose outgoing waveguide modes are of a same higher azimuthal order, a same radial order and also orthogonal to each other.

As previously mentioned, when demultiplexing a first incoming optical mode signal of a specific azimuthal and a specific radial order into a respective first intermediate signal, a rotation misalignment of this first incoming optical mode signal to the multiplicative masked used for demultiplexing has the effect, that not all signal components of this first incoming optical mode signal are properly transformed into the respective first intermediate signal. The remaining signal components will contribute to another second intermediate signal yielded by demultiplexing another second incoming optical mode signal of the same specific azimuthal and the same specific radial order, but whose mode pattern is orthogonal to the mode pattern of the first incoming optical mode signal.

The same applies to the second incoming optical mode signal of the specific azimuthal and the specific radial order: When yielding the respective second intermediate signal, a rotation misalignment of this second incoming optical mode signal to the multiplicative masked used for demultiplexing has the effect, that not all signal components of this second incoming optical mode signal are properly transformed into the respective second intermediate signal.

The remaining signal components will contribute to the first intermediate signal yielded by demultiplexing the first incoming optical mode signal.

The effect of the proposed choice for the incoming waveguide modes at demultiplexing and outgoing waveguide modes at multiplexing is the following: the two incoming signals of a same higher azimuthal and a same radial order can be considered as one combined incoming optical signal, while the two outgoing optical signals of a same higher azimuthal and a same radial order can be considered as one combined outgoing optical signal. Since the spatial modulators have mode patterns that act as multiplicative components, a linear transformation of all signal components of the combined incoming optical signal into the combined outgoing optical signal is ensured, by choosing a same incoming azimuthal and a same incoming radial order for the incoming waveguide modes and also a same outgoing azimuthal and a same outgoing radial order for the outgoing waveguide modes. In other words, all signal components of the two incoming signals are properly transformed into the two outgoing signals.

An overall rotation of the outgoing modes can be compensated at a receiving device using digital signal processing, as long as it is ensured that signal components of the two incoming mode signals of same azimuthal order and same radial order are transformed, by demultiplexing and multiplexing, as a whole into the two incoming mode signals of a same azimuthal order and a same radial order.

Thus, the proposed choice of azimuthal and radial orders for demultiplexing and also multiplexing makes it possible to map the two incoming waveguide mode signals into the two outgoing waveguide mode signals, without having to know the exact orientation of the two incoming waveguide mode signals for the step of demultiplexing.

BRIEF DESCRIPTION OF THE FIGURES

FIG. 2 shows a table of different mode patterns for modes that are possible within a multimode fiber.

FIG. 10 shows an embodiment of programmable optical spatial modulators.

DESCRIPTION OF EMBODIMENTS

Figure 1:
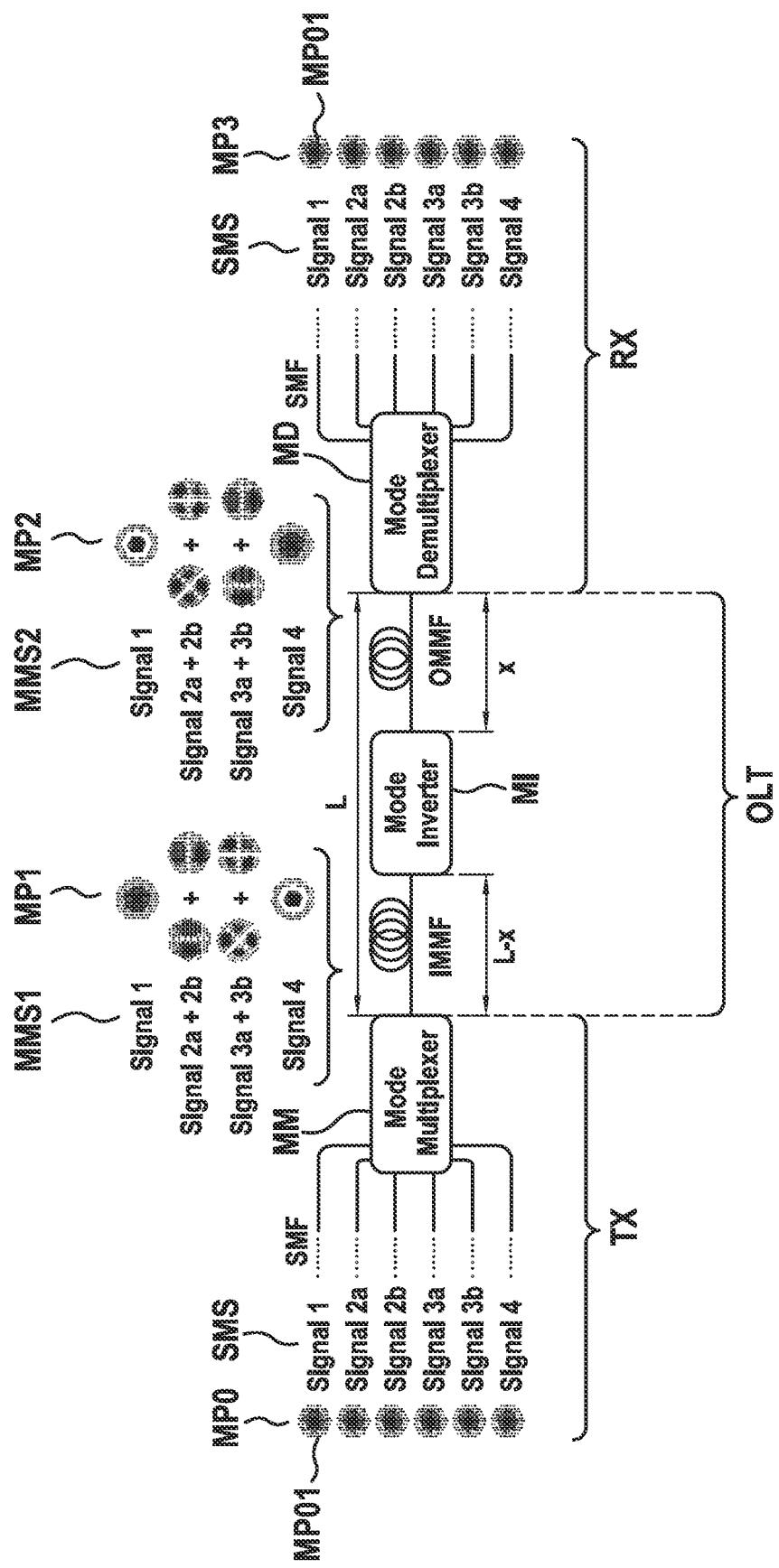
FIG. 1 shows a transmitter and a receiver together with different mode division multiplex signals at different stages of the transmission.

FIG. 1 shows different single mode signals as well as multi-mode signals at different stages of an optical transmission from a transmitting device TX to a receiving device RX.

The optical transmission line OLT between the transmitter TX and the receiver RX contains at least an incoming multi-mode fiber IMMF connecting the transmitter TX and the mode inverter MI, as well as an outgoing multi-mode fiber OMMF, which connects the mode inverter MI and the receiving device RX.

A number of single mode signals SMS are present at the transmitter TX. These single mode signals are present preferably within respective single mode fibers, such that the single mode signals SMS all have a mode MP0 with a mode pattern MP01, which corresponds to a fundamental mode within a single mode fiber. The transmitter TX contains furthermore a mode multiplexer MM, which converts the single mode signals SMS into respective multi-mode signals MMS1. By doing so, the mode multiplexer MM converts one or more of the single mode signals SMS into respective multi-mode signals MMS1 with respective mode patterns MP1, which are mode patterns of higher order modes.

FIG. 2 shows a table T1, in which for different modes of different orders the corresponding differential mode group delay and the corresponding mode pattern of the electrical field of the mode signal are shown.

For each mode, a corresponding index indicating the azimuthal order AO and also the radial order RO is given. As previously outlined, the mode pattern of a mode consists of zones with positive and negative sign, which define the amplitude of the complex electrical field within that plane of a multi-mode fiber, which is orthogonal to the direction of propagation. The azimuthal order defines the number of periods that a mode pattern has, when passing along a circular orbit around the origin of the mode pattern. The radial order defines the number of periods that a mode pattern has when passing from the origin of the node pattern outwards along a radius. For the mode LP01 the mode corresponding pattern MP01 is a pattern, which is rotationally invariant and which has no periodicity in the azimuthal direction. Furthermore, for the mode LP02 the corresponding mode pattern MP02 is a mode pattern that is rotationally invariant, while the periodicity in the radial direction is of the order 2.

For a mode of the order LP11, there is not only one single mode possible, but there is a first mode LP11a with the corresponding mode pattern MP11a and also a second mode signal LP11b with the corresponding mode pattern MP11b. The mode patterns MP11a and MP11b are orthogonal to each other, in that the surface integral of the product of these two mode patterns MP11a and MP11b is equal to zero.

The same applies to the mode patterns MP21b and MP21a of the mode LP21a and LP21b.

As it can be clearly seen from the table T1, the different modes have different values of differential mode group delay DMGD with respect to the fundamental mode LP01, while in the table T1 the given values indicate values of nano-seconds per kilometer.

As previously outlined, due to the fact that the different modes have different differential mode group delays DMGD, the different mode signals may arrive at a receiving device with different delays. Such delays may be compensated at the receiving device by signal processing algorithms, wherein such signal processing algorithms these days bear the problem, that they may compensate only a maximum delay between the different mode signals. Therefore when transmitting different mode signals along an optical transmission line, the distance of this optical transmission line may be limited by the ability of a signal processing algorithm within a receiver due to the maximum delay between the different mode signals, that the receiver is actually able to compensate.

Coming back to FIG. 1, a device for mode inversion MI, here called a mode inverter, is proposed. The mode inverter MI maps incoming optical signals MMS1 with respective waveguide modes MP1 into outgoing optical signals MMS2 with respective other outgoing waveguide modes MP2. This type of mode inversion has the advantage, that an optical signals travels along the optical transmission line OLT within the incoming multi-mode fiber IMMF for a first distance L-x and then along the outgoing multi-mode fiber OMMF for a distance x with another mode. This in turn leads to an averaged differential mode group delay for the incoming optical signal and the outgoing optical signal along the whole length L of the optical transmission line OTL. Thus, when transmitting data from the transmitter TX to the receiver RX by means of this incoming optical signal and this outgoing optical signal, the overall differential mode group delay for the data transmission along the optical transmission line OTL may be kept below the maximum delay, which the receiver RX is able to compensate, due to the averaging of the differential mode group delays of the different optical signals At the receiver RX, a mode demultiplexer MD demultiplexes the outgoing optical signals MMS2 with their respective mode patterns MP2 onto respective single mode signals SMS, which have a mode pattern MP3 that is the mode pattern MP01 of the fundamental mode LP01.

Figure 3:
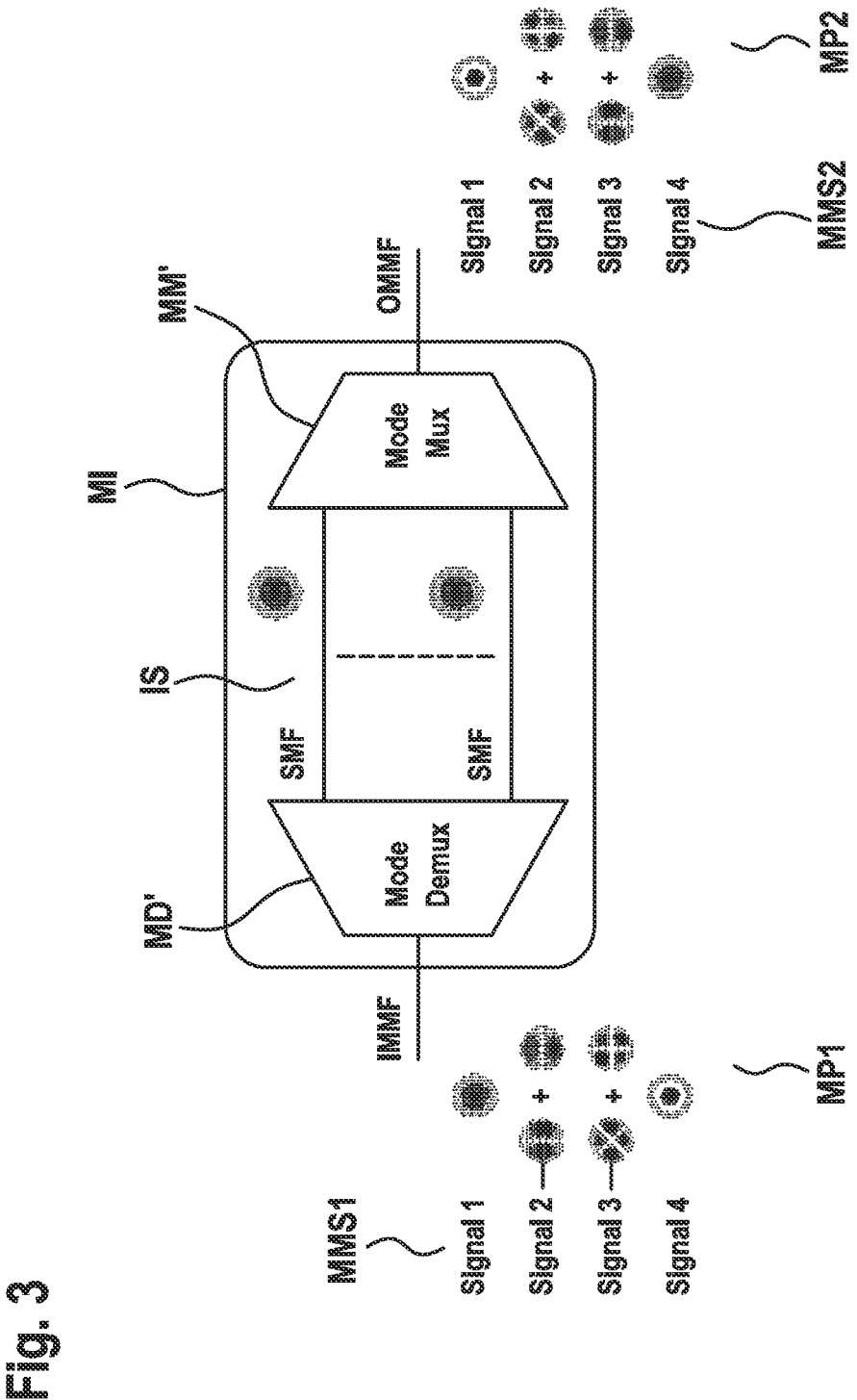
FIG. 3 shows a proposed device together with incoming and outgoing mode signals.

FIG. 3 shows the proposed mode inverter MI in more detail. The incoming optical signals MMS1 together with the respective mode patterns MP1 are received from the incoming multi-mode fiber IMMF via a mode demultiplexer MD' of the mode inverter MI. The mode demultiplexer MD' demultiplexes the incoming optical signals MMS1 into respective intermediate optical signals IS. The intermitted optical signals IS have a fundamental waveguide mode, as it can be seen in FIG. 3. The intermediate optical signals IS are then multiplexed by a mode multiplexer MM' onto respective outgoing optical signals MMS2 with respective outgoing waveguide modes MP2 into the outgoing multi-mode fiber OMMF.

The demultiplexing and multiplexing is carried out, using optical spatial modulators whose multiplicative patterns correspond to the electrical field patterns of the respective incoming and outgoing waveguide mode. This will be explained in more detail with regard to FIGS. 9a, 9b, 10 and 11.

Figure 4A:
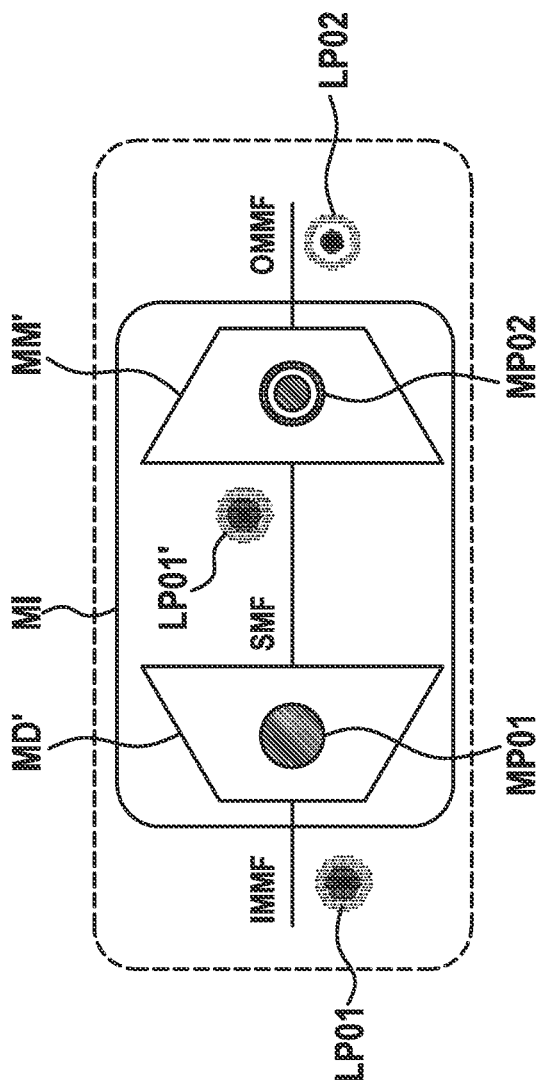
FIGS. 4a and 4b show the proposed device together with incoming and outgoing mode signals.

FIG. 4a shows a proposed configuration of the mode inverter MI for an incoming optical signal, whose respective waveguide mode has an azimuthal order equal to 0. In the example of FIG. 4a, the incoming optical signal is of a waveguide mode LP01. The mode demultiplexer MD' uses an optical spatial modulator with the multiplicative pattern MP01 that corresponds to the electrical field pattern of the incoming waveguide mode LP01. The resulting intermediate optical signal has a waveguide mode LP01', which is a fundamental mode. The mode multiplexer MM' multiplexes the intermediate optical signal into an outgoing optical signal within the outgoing multi-mode fiber OMMF, wherein this outgoing optical signal has an outgoing waveguide mode LP02, whose azimuthal order is also equal to 0.

FIG. 4a shows a configuration, in which an incoming optical signal of a rotationally invariant mode LP01 results in an outgoing optical signal of another rotationally invariant mode LP02. Another incoming optical signal of a rotationally invariant mode, for example the mode LP02, may be demultiplexed and multiplexed, such that it results in another outgoing optical signal of a rotationally invariant mode, for example the mode LP01.

Figure 4B:
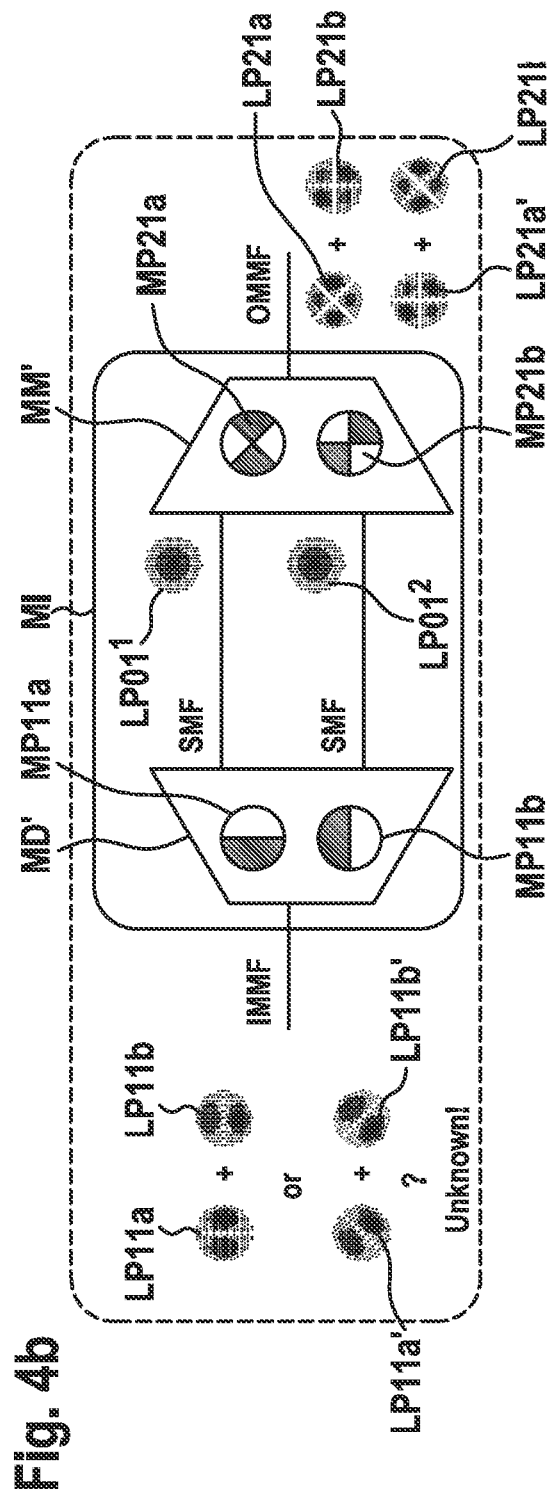

FIG. 4b shows a proposed configuration of the mode inverter MI for mapping incoming optical signals with a mode of an azimuthal order greater than 0 into respective outgoing optical signals with respective modes. The device MI is conFigured, such that two incoming optical signals with respective incoming waveguide modes LP11a and LP11b, which are of the same azimuthal order grater than 0 and the same radial order as well as orthogonal to each other, result in respective outgoing optical signals, whose waveguide modes LP21a and LP21b are also of a same azimuthal order greater than 0, a same radial order as well as orthogonal to each other. This is carried out, by filtering out the signal with the mode LP11a, using a spatial modulator whose multiplicative pattern corresponds to the electrical field pattern MP11a of the mode LP11a. This filtering results in the intermediate optical signal LP011.

Furthermore, the incoming optical signal of the mode LP11b is filtered out and converted to the incoming signal of the mode LP11b, using a spatial modulator with a multiplicative pattern, that corresponds to the electrical field pattern MP11b of the incoming mode signal LP11b, which results in an intermediate signal with the fundamental mode LP01$^2$. The intermediate signals of the modes LP01' and LP01$^2$ are then multiplexed into respective outgoing signals with respective modes LP21a and LP21b, using respective spatial modulators with respective multiplicative patterns that correspond to the mode patterns MP21a and MP21b of the modes LP21a and LP21b.

The transformation of the incoming signals with the modes LP11a and LP11b into the outgoing signals with the modes LP21a and LP21b can be seen as a linear transformation of a combined incoming containing the two incoming signals into a combined outgoing signal of the two outgoing signals. This is a linear transformation, since the spatial modulators use multiplicative patterns.

As it has been previously mentioned, the orientation of a mode may not be constant along an optical fiber, but may rotate. In such a case, instead of receiving incoming signals with mode patterns LP11a and LP11b, it may be the case, that the incoming signals arrive at the mode inverter MI with rotated mode patterns shown in this examples as LP11a' and LP11b'. With the given configuration of the mode inverter MI, this leads to outgoing signals with modes LP21a' and LP21b', which are rotated with respect to the modes LP21a and LP21b. Due to the fact, that the spatial modulators use multiplicative patterns for demultiplexing and multiplexing, the linear transformation of the combined incoming signal, containing the incoming signals of the modes LP11a' and LP11b', into a combined outgoing signal, containing the two outgoing signals with the modes LP21a' and LP21b', is ensured. Therefore, by mapping incoming signals of modes of a same azimuthal order greater than 0, a same radial order and orthogonal mode patterns into such outgoing signals whose modes have a same azimuthal order greater than 0, a same radial order and orthogonal mode patterns, it is ensured, that all signal components of the combined incoming signal are transformed into a combined outgoing signal. The two outgoing signals with the respective mode LP21a' and LP21b', whose mode patterns are rotated, may then be detected by means of signal processing at a receiving device. For realigning rotated mode patterns of optical signals with such modes, whose same azimuthal order is greater than 0 and whose radial order is equal, prominent signal processing algorithms exist, such as provided in the publication "Seb J. Savory, 'Digital filters for coherent optical receivers', Optics Express, vol. 16, No. 2, pp. 804-817, 2008.

Figure 5:
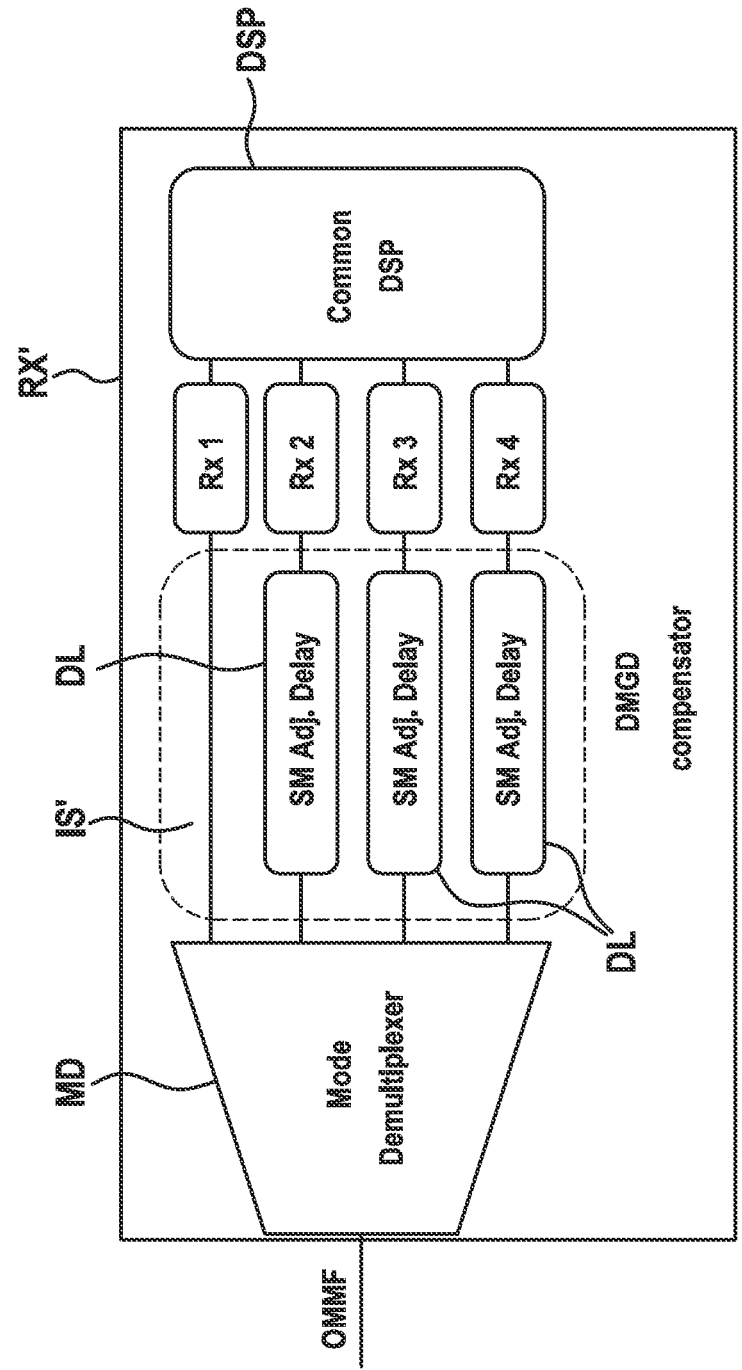
FIG. 5 shows a receiving device.

FIG. 5 shows a typical receiver RX' that may be used for demultiplexing different mode signals coming from a multi-mode fiber MMF and also for compensating a rotational variation of the mode patters of the received mode signals. The receiver RX' contains a mode demultiplexer MD, which demultiplexes signals of different modes into respective intermediate signals IS' of a fundamental mode. These intermediate signals IS' may be even furthermore delayed in time using respective delay lines DL for compensating differential mode group delay DMGD.

For each of the intermediate signals IS', a respective receiver RX1, . . . RX4 is present which samples the optical signal along two orthogonal polarization planes, and thus generates for each polarization plane a respective in-phase signal and a respective quadrature signal. These in-phase and quadrature signals are then passed on to the signal processing device DSP.

Figure 6:
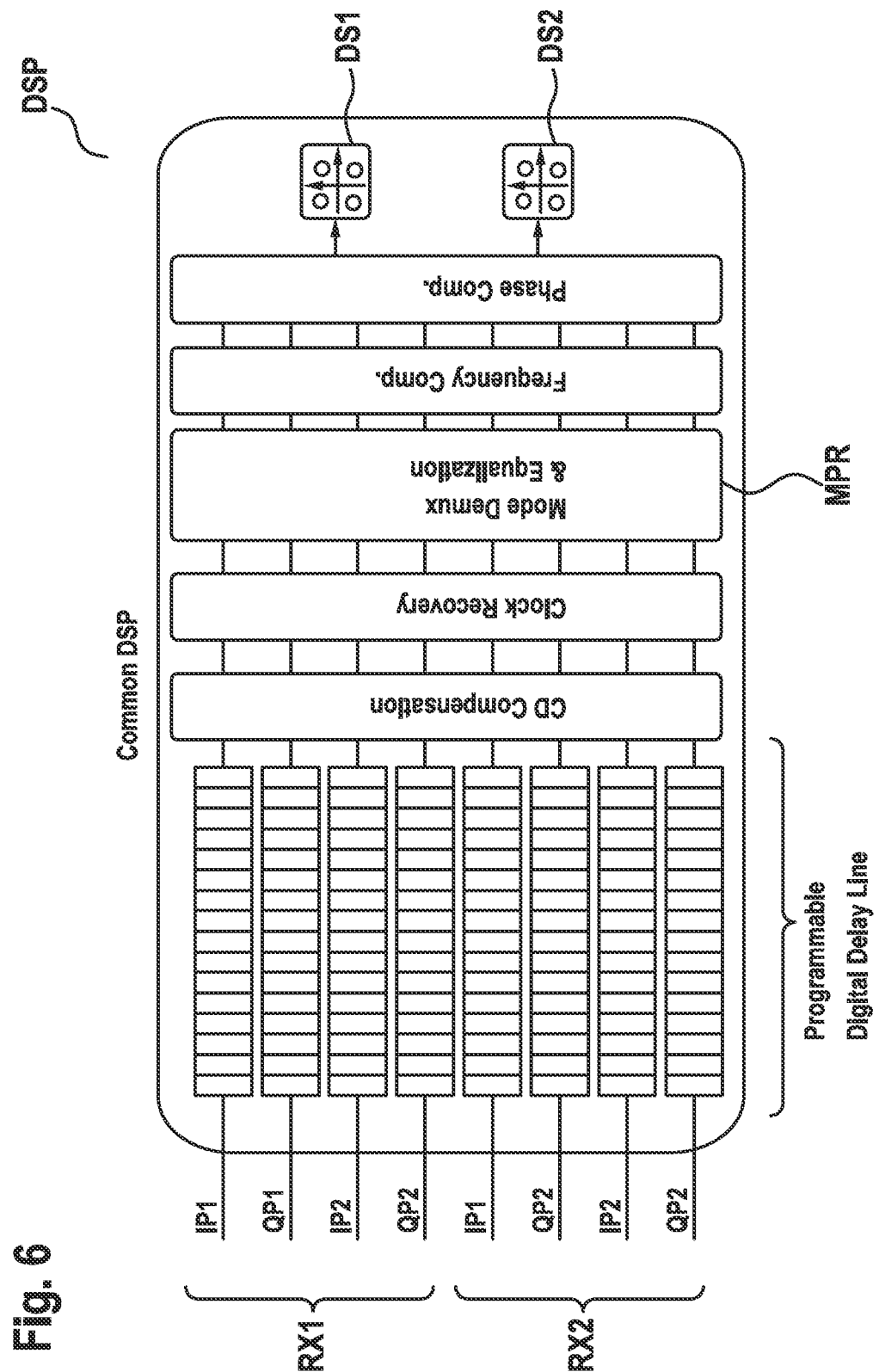
FIG. 6 shows a block diagram of signal processing steps carried out within the receiver.

The signal processing device DSP is shown in more detail in FIG. 6. The processing device DSP is shown together with respective signals coming from the receivers RX1 and RX2 only in this example. The signal processing device DSP may receive and process further signals of further receivers previously shown in FIG. 5.

The processing device DSP is provided with an in-phase signal IP1 and a quadrature signal QP1, which were generated by the receiver RX1, by sampling the optical signal of a first intermediate optical signal along a first polarization plane. Furthermore, the processor DSP is provided with an in-phase signal IP2 and a quadrature signal QP2, which are generated by the receiver RX1, by sampling the same first intermediate optical signal in its optical field along a second orthogonal polarization plane.

Respective in-phase and quadrature signals are provided to the processor DSP by or from the receiver RX2, by sampling a second intermediate optical signal.

Assuming now, that the receiver RX1 provides signals that shall represent an intermediate signal resulting from a signal within the multi-mode fiber of the mode LP21a shown in FIG. 4b, and that the receiver RX2 provides signals representing an intermediate signal resulting from a mode signal within the mode fiber MMF of the mode LP21b shown in FIG. 4b, the processing device DSP contains a step of mode demultiplexing MPR, in which a possible rotation of the axes of these mode patterns is compensated. Such a rotation of the mode patterns has been previously shown in FIG. 4b, in this example for the mode patterns of the modes LP21a' and LP21b'. Due to the fact, that the step of mode demultiplexing and equalization MPR treats together all the signals of a same azimuthal order and a same radial order, here provided by the receivers RX1 and RX2, it has to be only ensured at the mode inverter MI shown in FIG. 4b, that two signals of a same azimuthal order greater than 0 and a same radial order are mapped, such that they result in two outgoing signals of another same azimuthal order greater than 0 and another same radial order. Since this is ensured by the configuration of the mode inverter MI shown in FIG. 4b, receivers, such as shown in FIGS. 5 and 6 using the known signal processing algorithms mentioned previously, are able to detect and process the outgoing signal of the modes LP21a' and LP21b' properly, for deriving respective data signals DS1 and DS2 shown in FIG. 6.

The data signals DS1 and DS2 may have been generated, by individually modulating the respective mode signals using phase and/or amplitude modulation measure methods such as QAM or QPSK.

Figure 7:
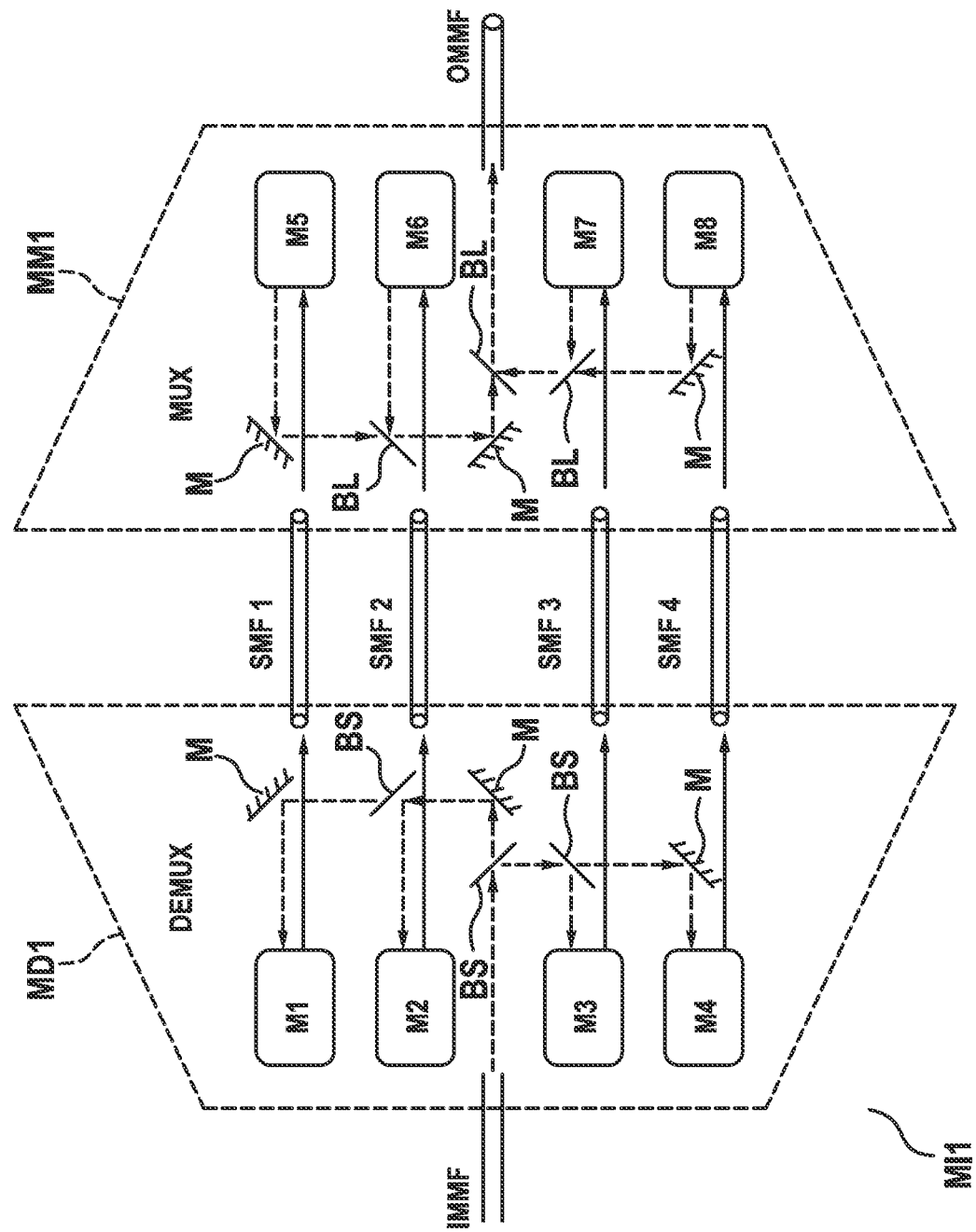
FIG. 7 shows the proposed device in more detail.

FIG. 7 shows a proposed mode inverter MI1 according to a preferred embodiment. The set of incoming optical signals received from the incoming multi-mode fiber IMMF is provided to the demultiplexer MD1, which acts in a manner similar to the mode demultiplexers MD' previously shown and described with regard to the FIGS. 3, 4a and 4b. Within the mode demultiplexer MD1, the set of signals is split and provided to a set of mode converters M1, . . . , M4, by means of beam splitters BS and mirrors M. A mode inverter M1, . . . , M4 contains at least an optical spatial modulator, whose multiplicative field pattern corresponds to the electrical field pattern of that incoming waveguide mode signal, which the respective mode converter M1, . . . , M4 filters out from the set of signals received from the IMMF. A mode inverter M1, . . . , M4 therefore filters out an incoming optical signal of a specific incoming waveguide mode and converts this incoming optical signal into a respective intermediate optical signal within a respective single mode fiber SMF1, . . . SMF4. An intermediate optical signal has a fundamental waveguide mode within the respective single mode fiber SMF1, . . . SMF4. The mode converters M1, . . . , M4 will be described in more detail with regard to the FIGS. 9a and 9b.

A mode multiplexer MM1 receives the intermediate optical signals and converts them into respective outgoing optical signals of respective outgoing waveguide modes within the outgoing multi-mode fiber OMMF. For this, the mode multiplexer MM1 contains respective mode converters M5, . . . , M8, which will be described with regard to the FIGS. 9a and 9b in detail later on. The outgoing optical signals provided by the mode converters M5, . . . , M8 are then combined by means of mirrors M and beam combiners BC, in order to provide them to the outgoing multi-mode fiber OMMF.

The mode converters M1, . . . , M8 shown in FIG. 7 are preferably mode converters, which rely on phase masks as optical spatial modulators.

Figure 8:
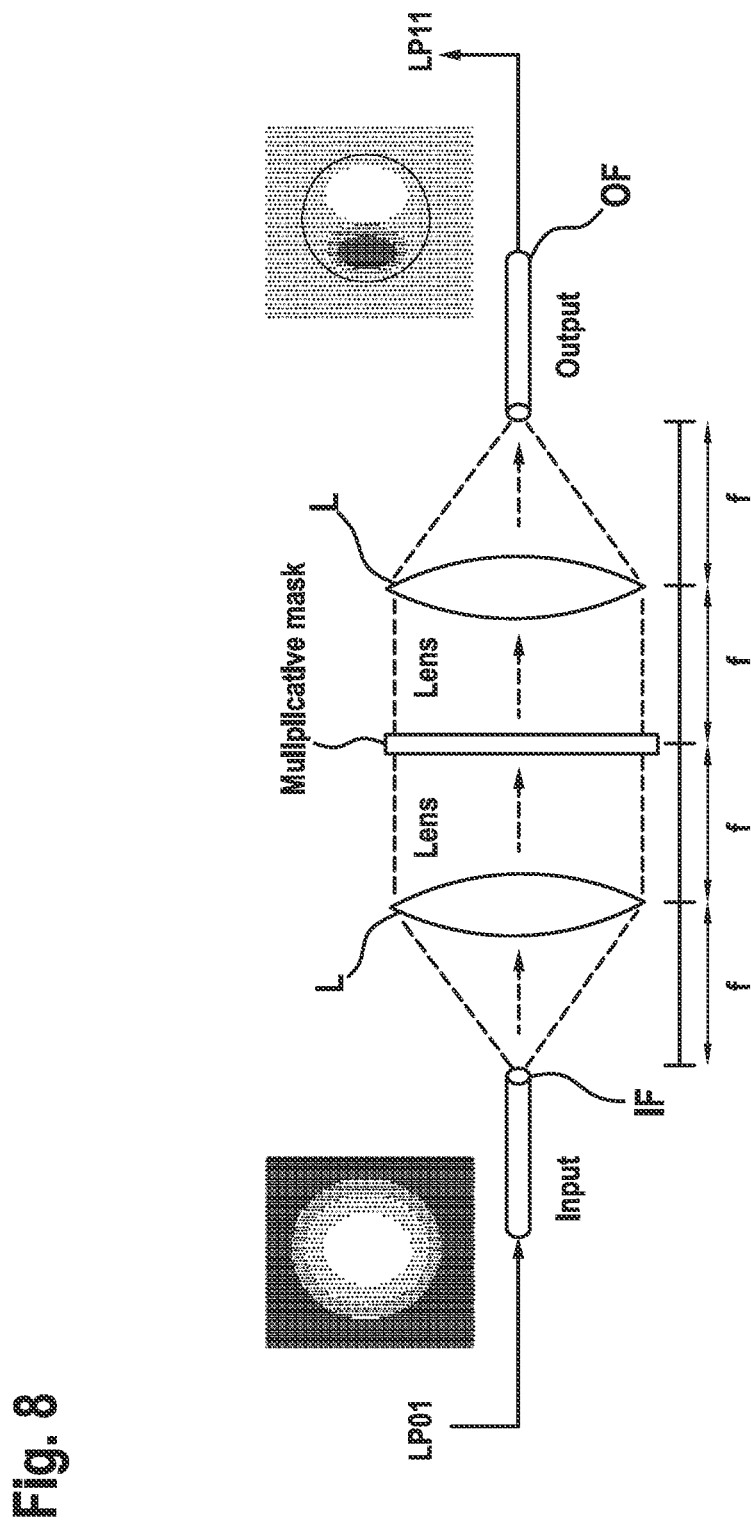
FIG. 8 shows an arrangement for modifying a mode signal in a frequency domain.

The principle of using a multiplicative phase mask is outlined in FIG. 8. A signal received from an input fiber IF is provided from the input fiber IF to a lens L, wherein the distance between the input fiber and the lens L is given as f. The lens then provides the received optical signal to a multiplicative mask and then further on to a further lens L, which provides the optical signal to an output fiber OF. The end of the input fiber IF, the lenses, the multiplicative mask and the beginning of the output fiber OF are each spaced apart from each other by a distance f. This is called a 4f correlator, as it is known from the publication "Joseph W. Goodman, 'Introduction to Fourier Optics', 2nd edition, McGraw-Hill, 1996".

Such a 4f correlator generates at the multiplicative mask a Fourier transform of the optical signal received via the input fiber IF. For turning an input signal from the mode LP01 into an output signal of the mode LP11, the multiplicative mask has to have phase properties in the Fourier domain, which correspond to the amplitude properties of the mode pattern of the mode LP11. Such a mode pattern is given for example in the FIG. 11 as a mode pattern MP for the mode LP11a. One area of the mode pattern of the multiplicative phase mask therefore has to have a region, which causes a phase shift of 0, while the other region causes a phase shift of $\pi$.

Using respective multiplicative phase masks within a 4f correlator, corresponding specific output modes such as the mode LP11 shown in the FIG. 8 can be generated.

Figure 9A:
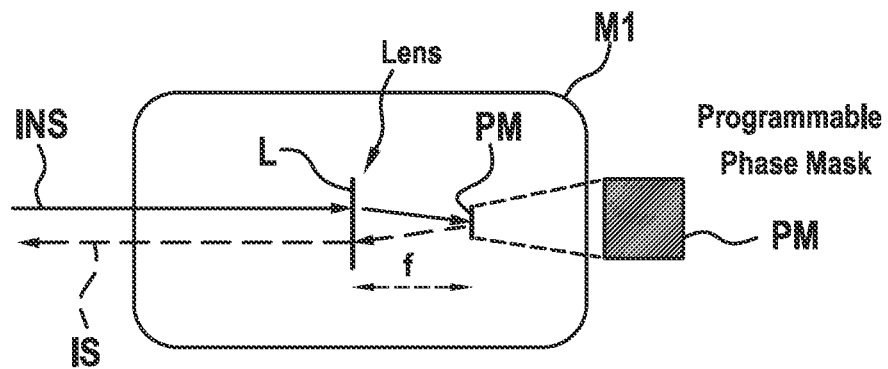
FIG. 9a shows a device for mode conversion.

FIG. 9a shows an embodiment of the mode inverter M1. An incoming optical signal INS is provided to a lens L and from there to a programmable phase mask PM, which is also shown enlarged on the right hand side. The phase mask PM reflects the incoming signal INS, while causing appropriate phase shifts, as previously outlined with regard to the FIGS. 8 and 11. The resulting signal passes the lens L and leaves the mode converter M1 as the outgoing signal OS. A spacing of an input fiber to the lens L by the distance f is not explicitly shown in FIG. 9a. Preferably, this spacing has a distance that is varied from f, in the case that only modes of the patterns LP01, LP11 and LP21 are used, in which case the proposed method and device still performs in a sufficient manner. These modes LP01, LP11 and LP21 have no radial periodicity and thus are insensitive to size changes of the phase mask, which would be induced by a misalignment of the mask along the axis in the direction of the distance f.

Figure 11:
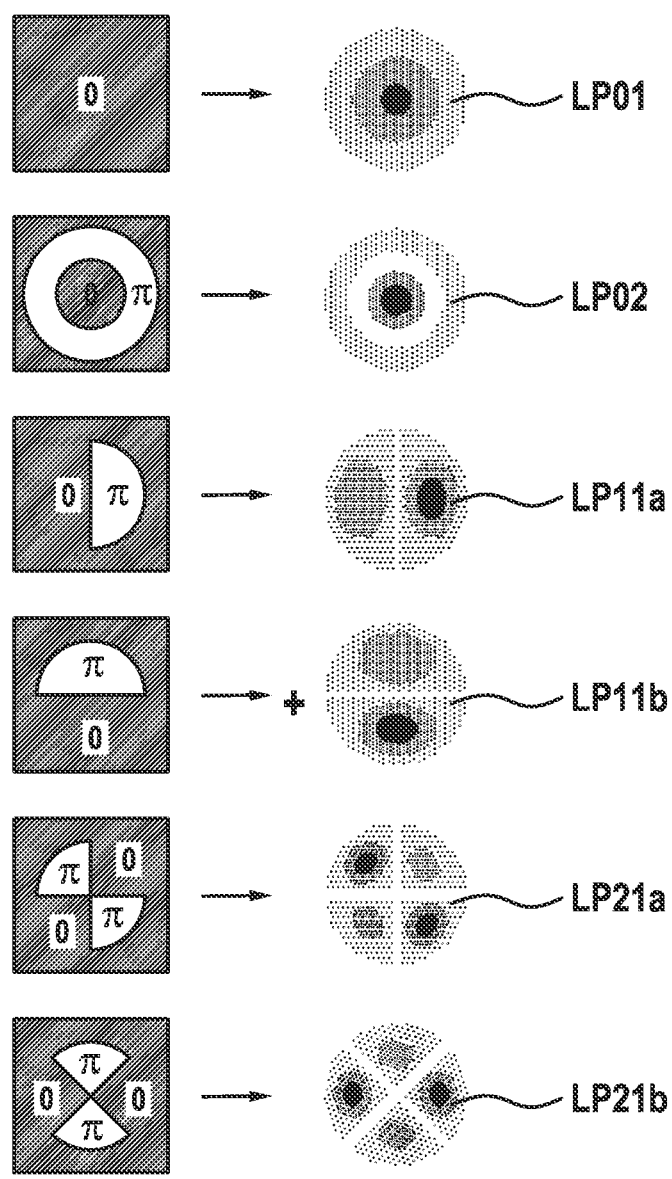
FIG. 11 shows phase patterns for respective mode patterns of optical signals.

Thus, by using the programmable phase mask PM, respective mode patterns MP shown in FIG. 11 can be generated for filtering out respective incoming optical signals of respective modes.

For demultiplexing an incoming optical signal INS of a higher order mode into an intermediate signal IS of a fundamental mode, the phase masks PM takes on a phase pattern, that corresponds to the phase pattern of the higher order mode.

In other words, a mode pattern consists of zones with positive and negative sign for the complex electrical field, which are equivalent to phase levels of 0 and pi in the Fourier domain. Number and order of zones with different sign remain constant after the 2-dimensional Fourier-Transform even though their relative size can change. Hence, converting one mode into another can be well-approximated by a mask, which performs phase shifts to the input mode, so that the incoming "phase-zones" are mapped onto the desired outgoing "phase-zones". In the special case of an incoming LP01 mode, the incoming mode consists only of a single phase-zone, and so the conversion mask corresponds directly to the phase-zone-pattern of the desired output mode. When demultiplexing, the uniqueness of the modes' phase-patterns guarantees that only the phase-pattern of the mode, which shall be selected, is mapped onto the phase-pattern of the output mode, preferably the mode usually LP01. Hence all other modes can afterwards be filtered out, by a device such as an single mode fiber.

The mode converter M1 shown in FIG. 9a is operable to convert an incoming signal INS of a higher order mode into an intermediate signal IS of fundamental mode. Mode converters M5, . . . , M8 shown in FIG. 7 for converting an intermediate signal into an outgoing signal are similar in structure to the mode converter M1 shown in FIG. 9a, wherein such mode converters M5, . . . , M8 shown in FIG. 7 have a phase mask with a phase patterns, that correspond to the mode pattern of the respective outgoing optical signal. For setting the configuration of the mode inverter MI1 shown in FIG. 7, a control unit, not explicitly shown, may be used. Such a control unit is preferably given as one or more control units, interacting with each other, wherein the control unit or control units have one or more interfaces that are operable to interact with the control end or management plane.

FIG. 9a shows a mode converter M1 in the case, that no polarization division multiplexing is used. In the case, that an incoming mode signal reaches the phase mask PM, which is preferably a liquid chrystal on silicone (LCOS), with a polarization orientation that is not aligned with the polarization orientation preferred by the phase mask PM, the transmitted signal power is reduced.

Figure 9B:
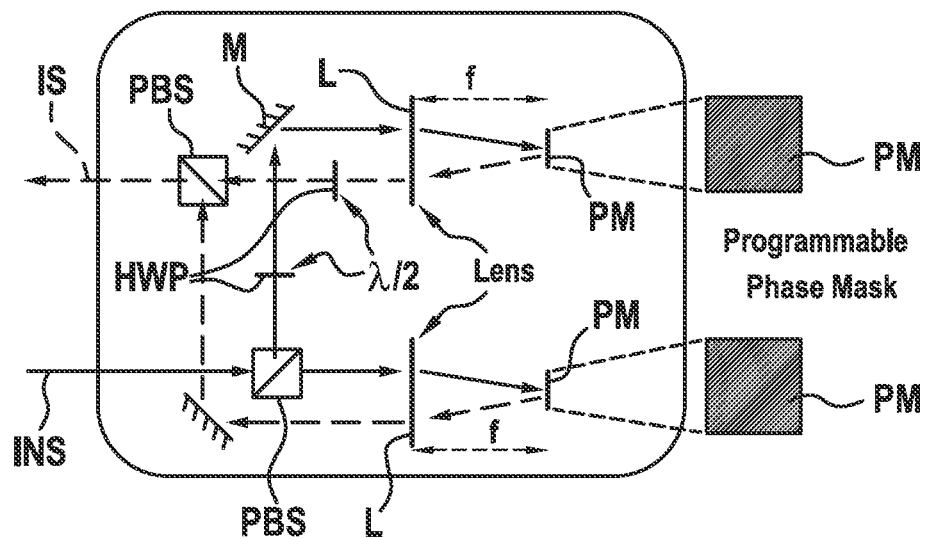
FIG. 9b shows a device for mode conversion in the case of polarization multiplexing.

FIG. 9b shows the proposed mode converter of FIG. 9a according to a further solution in the case, that polarization division multiplexing is used.

The incoming optical signal INS is split by a polarization beam splitter PBS into two orthogonal polarization components, wherein one component is directly provided to a lens L then to a phase mask PM, as previously described with regard to FIG. 9a. The other component is rotated in its polarization state, using a half wave plate HWP, and is then provided to a lens L and furthermore to a phase mask PM. This other component passes the lens L once more and is then rotated in its polarization state once more using a half wave plate HWP. The first component and the second component are recombined at a polarization beam splitter PBS to an intermediate signal IS.

The phase masks PM shown in FIG. 9b are similar in structure and function to the phase mask PM previously shown and described with regard to the FIG. 9a.

In the configuration in FIG. 9b, a misalignment of the beam splitter's PBS polarization axes to the polarization axes of the incoming signal causes a signal contribution of one polarization state of the incoming signal onto both masks PM. The other polarization state then also causes a signal contribution of the incoming signal onto both masks PM. These contributions are later on re-combined by the proposed device.

The proposed phase masks PM shown in the FIGS. 9a and 9b are preferably LCOS masks within a mode inverter M1, wherein these phase masks PM are reflective masks.

According to an alternative solution, a mode inverter may be arranged, such that an incoming optical signal, propagating into the mode inverter from one side, is provided to a transparent phase mask, such that the incoming optical signal passes this transparent phase mask and then propagates further, leaves the mode inverter on the other side. Such a transparent phase mask is preferably a fixed mode selective phase masks fabricated in glass. In the case of polarization multiplexing, incoming optical signals may be split and recombined, using mirrors M and beam splitters PBS shown in FIG. 9b. In the case of using mode selective phase masks fabricated in glass, a configuration between a demultiplexer and a multiplexer will have to be allowed, as described with regards to FIG. 12 further below.

FIG. 11 shows the respective mode patterns MP of the phase masks for the corresponding modes.

FIG. 10 shows an embodiment of a combined phase mask CPM, which contains multiple phase masks PM on one silicon device, wherein the different phase masks PM are used as phase masks for respective mode converters M1, . . . , M4. In this example, each mode converter M1, . . . , M4 contains two phase masks PM for allowing mode conversion in the case of polarization division multiplexing.

The phase masks PM are preferably liquid crystals on silicon on a combined surface. The combined phase masks CPM and its phase masks PM are preferably configurable and programmable by a control unit CTRL. This has been previously described in detail.

The control unit CTRL sets the mode patterns of the phase masks PM in dependence on a control signal that is received at the mode inverter.

Coming back to FIG. 7, it was previously described, that the intermediate signals are passed from the demultiplexing device MD1 to the multiplexing device MM1 by means of single mode optical fibers. Alternatively, the intermediate signals may be passed within respective optical free space paths or within respective waveguides of integrated devices.

As previously outlined with regard to the FIGS. 8, 9a, 9b, 10 and 11, the spatial modulators may be given as phase masks within 4f correlators performing a Fourier or frequency transformation. The phase patterns of the spatial modulators correspond to the mode patterns of the respective mode signals. Alternatively, the mode converters M1, . . . , M8 shown in FIG. 7 do not rely on 4f correlators for frequency or Fourier transformation, but perform spatial modulation directly by using amplitude masks, whose amplitude values correspond to the amplitude values of the mode patterns of the respective mode signals.

In other words, mode conversion may be performed, by emphasizing the amplitude distribution of the desired mode using an amplitude mask. For example, in order to strengthen modes with an azimuthal order greater than 0 over modes with an azimuthal order equal to zero 0, an attenuation can be applied to the center of the mode, since modes with an azimuthal order equal to zero 0 have in this center region a maximum amplitude, whereas all other modes have an amplitude of 0 at this center region.

As previously outlined with regard to FIG. 4b, the mode inverter MI perform demultiplexing and multiplexing, such that two incoming optical signals of specific mode patterns, for example incoming modes signals LP11a' and LP11b', of the same azimuthal order greater than 0, a same radial order and orthogonal mode patterns results in such outgoing optical signals, whose mode patterns, for example LP21a' and LP21b', are also of a same azimuthal order greater than 0, a same radial order and also orthogonal to each other. For ensuring, that an additional delay between signal components of the incoming signals caused by the steps of demultiplexing and multiplexing is minimized, it has to be ensured that an overall optical distance from the incoming multi-mode fiber IMMF, shown in FIG. 7, up to the outgoing multi-mode fiber OMMF, shown in FIG. 7, is for the incoming optical signal LP11a' together with its respective intermediate signal and its respective outgoing signal equal to the overall optical distance for the incoming signal LP11b' together with its intermediate signal and its respective outgoing signal.

Figure 12:
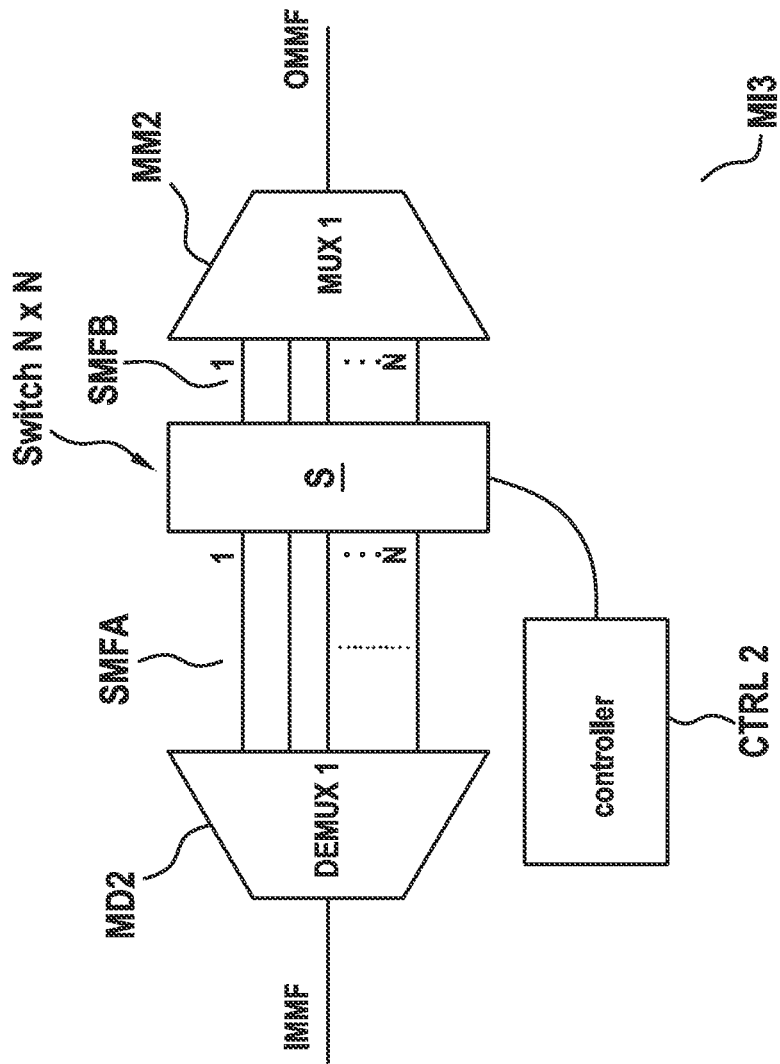
FIG. 12 shows a further embodiment of the proposed device.

FIG. 12 shows an alternative embodiment for a mode inverter MI3. The mode inverter MI3 contains the multiplexer MD2, which is similar in structure and function to the mode demultiplexer MD1 shown in FIG. 7. Furthermore, the mode inverter MI3 contains a mode multiplexer MM2, which is in general similar in structure and function to the mode multiplexer MM1 shown in FIG. 7.

The mode inverter MI3 of FIG. 12 differs from the mode inverter MI1 of FIG. 7 in two main aspects. Firstly, the demultiplexer MD2 and the multiplexer MM1 are connected by single mode fibers SMFa and SMFb, which in turn are interconnected by a switch S with N×N switching capability. The number N is equal to the number of single mode fibers SMFa, SMFb. Secondly, the demultiplexer MD2 and the multiplexer MM2 differ from the demultiplexer MD1 and multiplexer MM1 of FIG. 7, in that the respective mode converters do not contain programmable phase masks, but instead fixed mode selective phase masks. The configuration capability of the mode inverter MI3 is given by a control unit CTRL2, which configures the switch S. Preferably, masks used within demultiplexer MD2 and the multiplexer MM2 are fixed mode selective phase masks fabricated in glass.

The control units CTRL shown in FIG. 10 and CTRL2 shown in FIG. 12 as well as the control unit mentioned with regard to the FIGS. 9a and 9b preferably receive control signals via one of the received mode signals. Preferably, the mode signal used for transmission of control signals is that of a fundamental mode LP01.

The invention claimed is:
1. Method of optical data transmission using Mode Division Multiplexing, comprising
   demultiplexing a plurality of incoming optical signals having respective incoming waveguide modes from an incoming optical multi-mode fiber into respective intermediate optical signals having essentially a fundamental waveguide mode, multiplexing said intermediate optical signals into respective outgoing optical signals having respective outgoing waveguide modes within an outgoing optical multi-mode fiber, wherein the step of demultiplexing is carried out, using respective first optical spatial modulators, whose multiplicative patterns, correspond to the electrical field patterns of said incoming waveguide modes, and wherein the step of multiplexing is carried out, using respective second optical spatial modulators, whose multiplicative patterns, correspond to the electrical field patterns of said outgoing waveguide modes, wherein the steps of demultiplexing and multiplexing are carried out, such that a first incoming optical signal, whose respective first incoming waveguide mode is of an azimuthal order equal to zero, results essentially in such a first outgoing optical signal, whose respective first outgoing waveguide mode is of an azimuthal order equal to zero, and such that two second incoming optical signals, whose respective second incoming waveguide modes are of a same azimuthal order greater than zero,
of a same radial order, and
orthogonal to each other result essentially in such respective second outgoing signals, whose respective second outgoing waveguide modes are of a same azimuthal order greater than zero,
of a same radial order, and
orthogonal to each other, wherein said same azimuthal order of said second incoming waveguide modes is different from said same azimuthal order of said second outgoing waveguide modes, and wherein said first incoming waveguide mode has a radial order that is different from a radial order of said first outgoing waveguide mode.

2. Method according to claim 1,
wherein said optical spatial modulators are phase- and/or amplitude-masks.

3. Method according to claim 2,
wherein said steps of demultiplexing and multiplexing are carried out, using 4f-correlators,
and wherein said optical spatial modulators are phase-masks having multiplicative phase patterns that correspond to the electrical field patterns of said incoming and said outgoing waveguide modes.

4. Method according to claim 3,
wherein said phase-masks are programmable liquid crystals on silicon.

5. Method according to claim 3,
wherein said phase-masks are fixed mode-selective phase masks.

6. Method according to claim 1,
wherein said intermediate optical signals are transmitted within respective single-mode optical fibers, within respective optical free-space paths or within respective waveguides of integrated devices.

7. Method according to claim 1,
wherein an overall optical distance from said incoming multi-mode fiber to said outgoing multi-mode fiber for one of said two second incoming optical signals, its respective intermediate optical signal and its resulting respective outgoing optical signal is equal to an overall optical distance from said incoming multi-mode fiber to said outgoing multi-mode fiber for the other of said two second incoming optical signals, its respective intermediate optical signal and its resulting respective outgoing optical signal.

8. Method according to claim 1,
wherein said first incoming waveguide mode is of a radial order that is different from a radial order of said respective first outgoing waveguide mode,
comprising furthermore receiving at least one control signal,
wherein said radial order of said respective first outgoing waveguide mode
and said same azimuthal order and said same radial order of said respective second outgoing signals are chosen in dependence on said control signal.

9. Method according to claim 1,
wherein said same azimuthal order of said second incoming optical signals is different from said same azimuthal order of said second outgoing optical signals, and/or
said same radial order of said second incoming optical signals is different from said same radial order of said second outgoing optical signals.

10. Optical data transmission device for Mode Division Multiplexing, comprising an optical mode demultiplexer, operable to demulitplex a plurality of incoming optical signals having respective incoming waveguide modes from an incoming optical multi-mode fiber into respective intermediate optical signals having essentially a fundamental waveguide mode, an optical mode multiplexer, operable to multiplex said intermediate optical signals into respective outgoing optical signals having respective outgoing waveguide modes within an outgoing optical multi-mode fiber, wherein said optical mode demultiplexer comprises respective first optical spatial modulators, whose multiplicative patterns are operable to correspond to the electrical field patterns of said incoming waveguide modes, and wherein said optical mode multiplexer comprises respective second optical spatial modulators, whose multiplicative patterns are operable to correspond to the electrical field patterns of said outgoing waveguide modes, wherein said optical mode demultiplexer and said optical mode multiplexer are operable, such that a first incoming optical signal, whose respective first incoming waveguide mode is of an azimuthal order equal to zero, results essentially in such a first outgoing optical signal, whose respective first outgoing waveguide mode is of an azimuthal order equal to zero, and such that two second incoming optical signals, whose respective second incoming waveguide modes are of a same azimuthal order greater than zero,
of a same radial order, and
orthogonal to each other result essentially in such respective second outgoing signals, whose respective second outgoing waveguide modes are of a same azimuthal order greater than zero,
of a same radial order, and
orthogonal to each other, wherein said same azimuthal order of said second incoming waveguide modes is different from said same azimuthal order of said second outgoing waveguide modes, and wherein said first incoming waveguide mode has a radial order that is different from a radial order of said first outgoing waveguide mode.

11. Optical data transmission device according to claim 10, wherein said optical spatial modulators are phase- and/or amplitude-masks.

12. Optical data transmission device according to claim 11, wherein optical mode multiplexer and said optical mode demultiplexer comprise respective 4f-correlators, and wherein said optical spatial modulators are phase-masks whose multiplicative phase patterns are operable to correspond to the electrical field patterns of said incoming and said outgoing waveguide modes.

13. Optical data transmission device according to claim 12 wherein said phase-masks are programmable liquid crystals on silicon.

14. Optical data transmission device according to claim 13, wherein said phase-masks are fixed mode-selective phase masks.

\* \* \* \* \*